United States Patent Office 2,792,429
Patented May 14, 1957

2,792,429

PRODUCTION OF DIHYDROXY DIPHENYL ALKANES

John M. Whelan, Jr., Lyndhurst, N. J., assignor to Union Carbide and Carbon Corporation, a corporation of New York No Drawing. Application September 22, 1953, Serial No. 381,756

9 Claims. (Cl. 260—619)

This invention relates to an improved process for preparing dihydroxy diphenyl alkanes by reacting a monohydric phenol having at least two reactive positions on the phenyl ring with a water-soluble saturated aliphatic ketone or aldehyde in solution in an aqueous acidic medium.

It is known that monohydric phenols such as phenol can be reacted with aldehydes or ketones to form dihydroxy diphenyl alkanes. The reaction is promoted by acid catalysts and to increase the yields of the desired dihydroxy diphenyl alkanes more than stoichiometrical proportions of phenol to aldehyde or ketone are normally used, as for example six mols of phenol to one mol of formaldehyde. Ordinarily there are no by-products formed when monohydric phenols having only one reactive position are reacted with a ketone or an aldehyde. However, phenols having two or three reactive positions on the ring such as ortho cresol and phenol when reacted with an aldehyde or ketone form not only dihydroxy diphenyl alkanes, but undesired novolak-type resinous condensation products of higher molecular weight than the diphenylol alkanes because of further condensation by the aldehyde or ketone in the reaction system with the dihydroxy diphenyl alkanes.

In the reaction of phenol with formaldehyde in the presence of an acid catalyst and with large excesses of phenol there are obtained in addition to novolak-type resins, three isomeric dihydroxy diphenyl methanes, namely 2,2'-dihydroxy diphenylmethane, 2,4'-dihydroxy diphenylmethane and 4,4'-dihydroxy diphenylmethanes. The 4,4'-isomer can be separated, but in so doing yields thereof below 30% of theoretical are obtained due to material losses involved in isolating the isomer. This is a serious disadvantage since the 4,4'-isomer has technical and product advantages over the other isomers in reacting with epichlorhydrin to produce heat-hardenable epoxy products.

Furthermore, the use in the conventional process of an excess of stoichiometrical proportions of the phenol to the aldehyde or ketone for example 6 mols or more of the phenol per mol of the carbonyl compound requires for economical reasons recovery of the unreacted phenol and its purification before reuse can be made of it.

Accordingly, one object of the present invention is to produce dihydroxy diphenyl alkane using essentially stoichiometrical proportions or even less of the phenol reactant to the aldehyde or ketone.

Another object is to react phenol with a water-soluble aldehyde or a ketone in an acedic aqueous solution of such concentration and volume as to cause precipitation therefrom of the dihydroxy diphenyl alkanes as they are produced in the aqueous reaction medium.

A further object is to react together phenol and formaldehyde in an acidic aqueous solution of such concentration that a three-phase reaction mass is formed comprising an aqueous acid layer, an oily organic layer containing a mixture of isomeric dihydroxy diphenylmethanes, minor amounts of higher molecular weight phenol-formaldehyde condensation products in addition to some water, acid, unreacted phenol and formaldehyde; and a third phase of essentially 4,4'-dihydroxy diphenylmethane in crystalline form.

A further object is to react together a monohydric phenol and a water-soluble aldehyde or ketone in a continuous manner while in solution in a catalytic reaction medium comprising an acidic aqueous solution to produce dihydroxy diphenyl alkanes, and precipitate such alkanes from the reaction medium as they are produced.

An additional object is to react together phenol and formaldehyde in a continuous manner in an acidic aqueous solution of such acid concentration that water introduced in the reaction system as from the use of aqueous formaldehyde and that formed by the condensation reaction is substantially continuously removed as a constituent of the oily organic phase.

Another object is to reduce to minor amounts the formation of resinous by-products produced by condensation of the aldehyde or ketone with dihydroxy diphenyl alkanes.

The accomplishment of these objects and others will be understood as the description of the invention proceeds.

It has now been found that by reacting substantially stoichiometric quantities or less of a monohydric phenol having at least two reactive positions on the phenyl ring with a water-soluble saturated aliphatic ketone or aldehyde while in solution in a catalytic reaction medium consisting of an aqueous solution of hydrochloric acid or sulphuric acid having a normality of at least N/100 and preferably as least 1 N to 10.4 N in the instance of hydrochloric acid or about 1 N to 14 N for sulphuric acid, the amount of phenol present in the reaction mass not exceeding its solubility in the aqueous acidic solution, that the phenol reacts with the aldehyde or ketone in the aqueous reaction medium to form dihydroxy diphenyl alkanes, and since such alkanes are substantially insoluble in the aqueous acid solution they precipitate therefrom as an oily to viscous organic phase, and by this prompt removal or separation of such reaction products from the aqueous reaction zone, further condensation of the ketone or aldehyde with the alkanes to form undesired resinous products of higher molecular weight is substantially prevented.

The monohydric phenols useful in the practice of this invention are those showing an appreciable solubility in aqueous acid solutions, as for example phenol. In order that the reaction between the phenol and the carbonyl component be conducted in the aqueous phase, the aqueous acid solution must generally comprise 95% or more by volume of the reaction system. Although the phenol is thus present as a small fractional part of the reaction mass, being generally no more than 4% thereof, the advantages of dispensing with large excesses of phenol, of continuous operation, and of facile separation of the desired reaction products more than compensate for the seeming disadvantage of carrying out the reaction in such hightly dilute form.

Preferably the present process is conducted with substantially stoichiometric proportions of the phenol (2 mols) and the aldehyde or ketone (1 mol) and in fact, if desired can be operated with an excess of the carbonyl compound over stoichiometric proportions, because by immediately removing the dihydroxy diphenyl alkanes as they are formed further reaction of the alkanes with the aldehyde or ketone to form resinous derivatives is minimized.

Additionally, it has been found that in the reaction of phenol with formaldehyde in aqueous acid solutions of relatively low acid concentration, for example aqueous solutions of 2 N to 3 N hydrochloric acid, that the mixture of isomeric dihydroxy diphenylmethanes which are simultaneously produced, namely 2,2'-dihydroxy diphenylmethane, 2,4'-dihydroxy diphenylmethane and 4,4'-dihydroxy diphenylmethane, forms an oily to viscous organic phase in which the 4,4'-isomer is insoluble at temperatures below about 60° C. and can be readily separated therefrom in crystalline form by such means as filtration, centrifuging and equivalent separation procedures. The oily phase after separation therefrom of the 4,4'-isomer contains water, phenol, 2,2'- and 2,4'-dihydroxy diphenylmethane and some 4,4'-isomer and generally less than 30% of resinous phenol-formaldehyde condensation products.

With aqueous solutions of high acid concentrations, for example employing 38% aqueous hydrochloric acid or 70% aqueous sulphuric acid, the reaction between phenol and formaldehyde is much more rapid than at lower acidities.

While this is advantageous where preparation of crude diphenols is desired, its utility for preparation of pure crystalline 4,4'-dihydroxy diphenylmethane is obviated by a concomitant effect. The viscosity of the oily organic phase is largely dependent on its water content. At high acidities the affinity of the aqueous acid phase for water is greater, and thus the water content of the oil phase (in equilibrium with the acid phase) is reduced. The product under these conditions appears as a taffy-like resin, impeding separation of the desired 4,4'-isomer by simple filtration, centrifugation, etc., as is possible with the product when using acid concentrations below about 4 N. If the improved speed of reaction is desired in preparation of pure 4,4'-isomer, this may still be accomplished by separation of the taffy-like product and reducing the viscosity of its oily component by dilution with water, aqueous acetic acid, aqueous methanol or other suitable solvent, whereupon filtration for collection of the solid 4,4'-isomer may be readily effected.

When reacting together phenol and formaldehyde, it is preferred to use an aqueous hydrochloric acid of 2 N to 4 N concentration as the catalytic reaction medium. With such reaction mixture, it has been found that reaction temperatures of about 20° C. to 25° C., and substantially a stoichiometric molar ratio of two mols phenol per mol of aqueous formaldehyde (formalin, 37% formaldehyde content) gives optimum balance between reaction rates and separation conditions, particularly when the phenol concentration is equivalent to 0.2 mols (1.9% phenol) per 1000 parts by weight of the reaction mixture (phenol, formaldehyde and aqueous acid solution). Good results were also had with a phenol concentration of up to 0.4 mol phenol per 1000 parts reaction mixture, this concentration still being not in excess of the solubility value of phenol in the aqueous phase of the reaction mixture.

The minimum acid concentration producing a commercially satisfactory rate of reaction between the phenol and the aldehyde or ketone is about a 1 N acid solution. While acid solutions of lower normality than 1 N can be used if prolonged reaction times are of no consequence, ordinarily at least a 1 N solution would be used since the reaction rate increases as the square of acid concentration under these conditions and thus decreasing acid concentration markedly decreases reaction rate.

The process of the present invention is easily adapted to continuous reacting conditions. Basically there is required a reaction vessel equipped with heating and cooling means to maintain any desired reaction temperature from about zero to about 100° C. and slow speed agitating means. The vessel is partly filled with a suitable aqueous acid solution and then the phenol and the aldehyde or ketone is fed to the acid solution preferably in substantially stoichiometrical proportions, but at such a rate as not to exceed the solubility of the phenol in the aqueous acid and a rate substantially equivalent to the rate at which the dihydroxy diphenyl alkanes and incidental reaction by-products are formed, and continuously withdrawn. In the course of time, the aqueous acid tends to be diluted with water formed during the condensation, and such water as may be introduced by use of aqueous aldehydes or ketones. Make-up acid can then be added to regain the original acid concentration. However, it is possible to remove the water as formed or introduced by suitable choice of conditions including temperature and starting acid concentration value whereby sufficient water is absorbed in the organic layer of reaction products and constantly removed with it to obtain a water balance. For example, with stoichiometrical proportions of phenol and formaldehyde as formalin (2 mols:1 mol) being reacted at 20° C., a water balance can be had with the use of 9.5% aqueous hydrochloric acid as the catalytic reaction medium. By routine determinations, the water-balance conditions for other phenols, and ketones or aldehydes can be readily ascertained and then adopted in continuous production.

The herein disclosed reaction in an acidic aqueous medium and separation therefrom of the reaction products as an organic phase is applicable to all monohydric phenols of some solubility in aqueous acid solutions being at least 1 part per 1000 parts of aqueous acid. Moreover the phenols are characterized by having at least two reactive positions on the phenyl ring and containing if any, only alkyl or chloro substituents. Typical phenols that can be used in the practice of the invention are phenol; meta-, para-, and ortho-cresol; the xylenols such as 2,3-xylenol; 2,5-xylenol and 3,4-xylenol; paratertiary butyl phenol and ortho-, para, or meta chlorophenols.

The water-soluble carbonyl compounds that can be reacted with phenols according to the presently described process are the simple aliphatic aldehydes particularly formaldehyde and acetaldehyde, as well as propionaldehyde, n-butyraldehyde and isobutyraldehyde; but pentanal and higher aliphatic aldehydes are insufficiently water-soluble to be reacted with phenols by the present process. Suitable water-soluble aliphatic ketones are represented by acetone, methyl ethyl ketone, diethyl ketone and ethyl methyl ketone. Higher aliphatic ketones such as methyl n-butyl ketone and ethyl isopropyl ketone have insufficient water-solubility to be conveniently employed in this process.

The concentration of the preferred carbonyl compounds, aldehydes or ketones in the reaction mass is less critical than the phenol reactant and can vary from about 0.01 to 0.05 mol per 1000 parts of the reaction mass. Preferred molar ratios of carbonyl compound to the phenol should be at or slightly below the stoichiometric ratio of 2 mols phenol to one mol of carbonyl compound.

The invention is typically illustrated in the following example.

*Example 1*

To 40 ml. of warm aqueous solution four molar in phenol and two molar in formaldehyde were added 0.4 ml. normal hydrochloric acid. The solution was allowed to stand overnight in a 60° C. oven. A heavy oily organic layer settled out. On standing in water at room temperature, this oil deposited crystals of 4,4'-dihydroxy diphenylmethane.

A continuous process for reacting together phenol and formaldehyde is described in the following example:

*Example 2*

A glass enameled kettle equipped with an agitator and thermometer was charged with the following quantities of material in parts by weight. 305.5 parts (3.25 moles) distilled phenol, 130.0 parts (1.625 moles) formalin (37.5% formaldehyde), 10,000 parts water and 2,566 parts concentrated (38%) aqueous hydrochloric acid or a total of approximately 13,000 parts reaction material.

The concentration of phenol was thus 0.25 mole per 1000 parts reaction material and of formaldehyde 0.125 mole/1000 parts. The solution was agitated and held at a temperature of 25° C. Then a mixture of two moles phenol and one of formaldehyde was fed to the reaction mixture at the rate of 5.87 parts (.0625 mole) phenol and 2.5 parts (.0312 mole) formalin (37.5% formaldehyde) per hour or an amount of phenol and formaldehyde estimated as sufficient to maintain a concentration of phenol of 0.25 mole/1000 parts reaction material and a concentration of formaldehyde of 0.125 mole/1000 parts reaction material in the kettle. The reaction liquor was continuously withdrawn from the reaction kettle, circulated through a filter and decanter, the crystal and oily by-products removed and the acidic aqueous portion returned to the reactor. The crystalline product was collected and washed with 35% aqueous solution of acetic acid to free it of adhering oil and then with water. In a typical continuous run of four days the yield of crystalline material was 220.7 parts of crystalline 4,4'-dihydroxy diphenylmethane melting at 148-157° C. or a yield of about 35% based on phenol. At the end of this run, concentration of the phenol in the material in the reactor was 0.225 mole/1000 parts and of formaldehyde .082 mole/1000 parts. The oily by-products amounting to 371.4 parts had the following analysis by weight:

|   | Percent |
|---|---|
| Isomeric dihydroxy diphenylmethanes and higher molecular weight phenolformaldehyde condensation products | 66.0 |
| Phenol | 15.1 |
| Water | 8.9 |

The oil can be distilled to recover the phenol (56.1 parts) improving yield on phenol to 38.6%.

*Example 3*

A glass reaction vessel equipped with agitator and thermometer was charged with the following quantities of material in parts by weight. 94.0 parts (1.0 mole) distilled phenol, 40.0 parts (0.5 mole) 37½% formalin, 3,387 parts water and 1,479 g. concentrated (38%) hydrochloric acid. The initial phenol concentration was thus 0.2 mole phenol per 1000 parts reaction mixture and of formaldehyde 0.1 mole/1000 parts. The solution was agitated and held at a temperature of 25° C. while a mixture of two moles phenol to one mol of formalin was fed to the reaction mixture at a rate of 0.395 mole phenol and 0.1975 mole formalin per thousand parts of reaction mixture per day. Once each day the reaction mixture was filtered to remove crystalline 4,4'-dihydroxy diphenylmethane, and the oily by-product was separated from the filtrate. The crystalline product, after washing with dilute acetic acid and water and drying, was a light pink powder comprising essentially pure 4,4'-dihydroxy diphenylmethane; yield after three days of operation was 205.4 parts, or 36.6% of theoretical; (final concentration of phenol in the aqueous reaction mixture was 0.217 mole/1000 parts; of formaldehyde 0.882 mole/1000 parts). Phenol recoverable from the oil phase and washings amounted to 43 parts, improving yield to 39.8%. Other components of the oil phase were found to be:

3.6 parts 2,2'-dihydroxy diphenylmethane
25.6 parts 2,4'-dihydroxy diphenylmethane
22.0 parts 4,4'-dihydroxy diphenylmethane
55.5 parts higher condensation products The use of sulphuric acid as a catalyst is illustrated in the following example:

*Example 4*

To 500 parts by weight 50% aqueous sulphuric acid, held at 20-22° C. and stirred there were slowly added, over a period of 4¾ hours, 255.2 parts of a mixture of phenol and formalin in 3:1 mole ratio. After stirring 15 minutes longer, the aqueous acid layer was allowed to settle and was siphoned off. The viscous organic layer after addition of 500 parts water, appeared as a slurry of white crystals in a thin, light yellow oil. The crystals were filtered off and washed with dilute acetic acid, then water to give 27.6 parts crystalline 4,4'-dihydroxy diphenylmethane. This represents a 60% recovery of the 4,4'-isomer contained in the original resinuous product.

A typical reaction of a phenol with a ketone is described in the following example:

*Example 5*

To 500 parts by weight of 38% aqueous hydrochloric acid, stirred and held at 25° C., were added, twice daily, increments of 9.4 parts phenol and 2.9 parts acetone (mole ratio 2:1). After eight such additions, the reaction was allowed to stand for three days. A crystalline product was collected by filtration and was washed with 10% aqueous acetic acid. After drying in a desiccator, 97.7 parts of material containing some phenol of crystallization were obtained. This phenol was driven off by heating at 180° C. under 17 mm. Hg pressure, leaving 62.5 parts (68.5%) of dihydroxy diphenyl dimethylmethane melting at 156.2° C.

What is claimed is:

1. Process for producing dihydroxy diphenyl alkanes which comprises forming an aqueous reaction system consisting of substantially stoichiometric molar proportions of a monohydric phenol having more than one reactive position on the phenyl ring and formaldehyde in solution in an aqueous solution of an acid selected from the group consisting of sulphuric acid and hydrochloric acid of at least N/100 concentration, said acidic solution being substantially a non-solvent for the dihydroxy diphenyl alkanes formed in the reaction, and the total amount of phenol present in the reaction system being not in excess of its solubility in the aqueous solution, and then heating said aqueous reaction system to a reaction temperature to form a reacted mixture comprising an organic phase containing dihydroxy diphenyl alkanes and an acidic aqueous phase.

2. Process for producing dihydroxy diphenyl alkanes which comprises forming an aqueous reaction system consisting of substantially stoichiometric proportions of a monohydric phenol having more than one reactive position on the phenyl ring and formaldehyde in solution in an aqueous acid, of at least 1 N concentration, said acid being selected from the group consisting of sulphuric acid and hydrochloric acid, said aqueous acid being substantially a non-solvent for the dihydroxy diphenyl alkanes formed in the reaction and the concentration of phenol in the aqueous acid being not in excess of its solubility therein, and then heating said aqueous reaction system to form a reacted mixture comprising an acidic aqueous phase and an organic phase containing dihydroxy diphenyl alkanes and recovering the dihydroxy diphenyl alkanes by separating the organic phase from the aqueous phase.

3. Process for making dihydroxy diphenyl alkanes which comprises forming an aqueous reaction system consisting of substantially stoichiometric proportions of a monohydric phenol having more than one reactive position on the phenyl ring and formaldehyde in solution in an aqueous acidic reaction medium, the acid being selected from the group consisting of sulphuric acid and hydrochloric acid, the sulphuric acid solution having a concentration between 2 N and 14 N and the hydrochloric acid solution having a concentration between 2 N and 4 N, said aqueous reaction medium being substantially a non-solvent for the dihydroxy diphenyl alkanes formed in the reaction and the concentration of the phenol in said medium not exceeding its solubility therein, and then heating said aqueous reaction system to a reaction temperature between 0° and 100° C. to form a reacted mixture comprising an acidic aqueous phase and an organic phase containing dihydroxy diphenyl alkanes and higher molecular weight condensation products of the phenol and the carbonyl compound.

4. Process for making dihydroxy diphenylmethane which comprises forming an aqueous reaction system consisting of substantially stoichiometric proportions of phenol and formaldehyde dissolved in an aqueous reaction medium containing an acid selected from the group consisting of hydrochloric acid and sulphuric acid, the acid concentration being between about 1 N and 10.4 N for hydrochloric acid and between about 1 N and 14 N for sulphuric acid, the phenol being present in amount not exceeding its solubility in the aqueous reaction medium, and then heating said aqueous reaction system to a reaction temperature to form a reacted mixture comprising an acidic aqueous phase and an organic phase containing a mixture of isomeric dihydroxy diphenylmethanes including 4,4'-dihydroxy diphenylmethane.

5. Process for making dihydroxy diphenylmethanes which comprises forming an aqueous reaction system consisting of substantially stoichiometric proportions of phenol and formaldehyde dissolved in an aqueous reaction medium containing an acid selected from the group consisting of hydrochloric acid and sulphuric acid, the acid concentration being between about 1 N and 10.4 N for hydrochloric acid and between about 1 N and 14 N for sulphuric acid, the phenol being present in amount not exceeding its solubility in the aqueous reaction medium, and then heating said aqueous reaction system to a reaction temperature to form a reacted mixture comprising an acidic aqueous phase and an organic phase containing a mixture of isomeric dihydroxy diphenylmethanes including 4,4'-dihydroxy diphenylmethane in crystalline form, and then filtering the organic phase to remove crystalline 4,4'-dihydroxy diphenylmethane.

6. Continuous process for making dihydroxy diphenylmethanes which comprises forming an aqueous reaction system consisting of substantially stoichiometric proportions of phenol and formaldehyde dissolved in aqueous hydrochloric acid of a concentration between about 2 N and 3 N, the amount of phenol in the aqueous acid being not in excess of 0.4 mol per 1000 parts by weight of the reaction mixture of phenol, formaldehyde and aqueous acid and heating said aqueous reaction system to a temperature between about 20 to 25° C. to form a reacted mixture comprising an acidic aqueous phase and an organic phase containing a mixture of isomeric dihydroxy diphenylmethanes, continuously removing the organic phase from the reaction mixture while replenishing the reaction mixture with phenol and formaldehyde in substantially stoichiometric proportions.

7. Continuous process for making dihydroxy diphenyl alkanes which comprises forming an aqueous reaction system consisting of substantially stoichiometric proportions of a phenol having more than one reactive position on the benzene ring and formaldehyde in solution in an aqueous acid solution of at least 1 N concentration, said acid being selected from the group consisting of sulphuric acid and hydrochloric acid, the phenol being fed to the aqueous acid at rates such as not to exceed its solubility therein, and the aqueous acid being substantially a non-solvent for the dihydroxy diphenyl alkanes formed in the reaction, and then heating said aqueous reaction system to yield a reacted two-phase mixture, comprising an aqueous acidic phase and an organic phase containing a major amount of dihydroxy diphenyl alkane and minor amounts of unreacted phenol and water, the water being in amount substantially equivalent to that produced during the condensation reaction of the phenol and the carbonyl compound and by introduction to the reaction from the use of an aqueous carbonyl, continuously removing the organic phase from the reaction system while replenishing the reaction system with the phenol and carbonyl compound in substantially stoichiometric proportions.

8. Process for producing dihydroxy diphenyl alkanes which comprises forming an aqueous reaction system consisting of substantially stoichiometric molar proportions of a monohydric phenol having more than one reactive position on the phenyl ring and formaldehyde in solution in an aqueous solution of an acid selected from the group consisting of sulphuric acid and hydrochloric acid of at least N/100 concentration, said acidic solution comprising at least 95% by volume of the reaction system and being substantially a non-solvent for the dihydroxy diphenyl alkanes formed in the reaction, and the total amount of phenol present in the reaction system being not in excess of its solubility in the aqueous solution, and then heating said aqueous reaction system to a reaction temperature to form a reacted mixture comprising an organic phase containing dihydroxy diphenyl alkanes and an acidic aqueous phase.

9. Process for making dihydroxy diphenylmethane which comprises reacting forming an aqueous reaction system consisting of substantially stoichiometric proportions of phenol and formaldehyde dissolved in an aqueous reaction medium containing an acid selected from the group consisting of hydrochloric acid and sulphuric acid, the acid concentration being between about 1 N and 10.4 N for hydrochloric acid and between about 1 N and 14 N for sulphuric acid, the aqueous reaction medium comprising at least 95% by volume of the reaction system and the phenol being present in amount not exceeding its solubility in the aqueous reaction medium, and then heating said aqueous reaction system to a reaction temperature to form a reacted mixture comprising an acidic aqueous phase and an organic phase containing a mixture of isomeric dihydroxy diphenylmethanes including 4,4'-dihydroxy diphenylmethane.

References Cited in the file of this patent

UNITED STATES PATENTS

| 1,977,627 | Greenhalgh | Oct. 23, 1934 |
| 1,986,423 | Arvin | Jan. 1, 1935 |

FOREIGN PATENTS

| 711,122 | Great Britain | June 23, 1954 |